(12) United States Patent
Thelen et al.

(10) Patent No.: US 10,643,463 B2
(45) Date of Patent: May 5, 2020

(54) DETERMINATION OF A ROAD WORK AREA CHARACTERISTIC SET

(71) Applicant: VOLVO CAR CORPORATION, Gothenburg (SE)

(72) Inventors: Sebastian Thelen, Askim (SE); Erik Israelsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 127 days.

(21) Appl. No.: 15/958,422

(22) Filed: Apr. 20, 2018

(65) Prior Publication Data
US 2018/0315305 A1  Nov. 1, 2018

(30) Foreign Application Priority Data
Apr. 27, 2017  (EP) .................................... 17168467

(51) Int. Cl.
| | | |
|---|---|---|
| *G08G 1/01* | (2006.01) | |
| *G07C 5/08* | (2006.01) | |
| *G08G 1/0967* | (2006.01) | |
| *G01C 21/26* | (2006.01) | |

(52) U.S. Cl.
CPC ........... *G08G 1/0133* (2013.01); *G01C 21/26* (2013.01); *G07C 5/08* (2013.01); *G08G 1/0112* (2013.01); *G08G 1/0141* (2013.01); *G08G 1/0967* (2013.01)

(58) Field of Classification Search
CPC .................................................. G08G 1/0133
See application file for complete search history.

(56) References Cited

U.S. PATENT DOCUMENTS

| | | | | |
|---|---|---|---|---|
| 6,559,774 | B2* | 5/2003 | Bergan | G08G 1/081 340/907 |
| 9,123,152 | B1* | 9/2015 | Chatham | G01C 21/34 |
| 9,751,463 | B1* | 9/2017 | Ramcharitar | G08G 1/162 |
| 2009/0115638 | A1* | 5/2009 | Shankwitz | G01C 21/26 340/988 |
| 2013/0033384 | A1* | 2/2013 | Pierlot | G08G 1/0104 340/905 |
| 2013/0282264 | A1* | 10/2013 | Bastiaensen | G01C 21/3492 701/119 |

(Continued)

OTHER PUBLICATIONS

Extended European Search Report dated Nov. 7, 2017, Application No. 17168467.3—1557, Applicant Volvo Car Corporation, 9 Pages.

*Primary Examiner* — Alex C Dunn
(74) *Attorney, Agent, or Firm* — Brooks Kushman P.C.

(57) ABSTRACT

The present disclosure relates to a method for determining a road work area characteristic set comprising at least one characteristic associated with a road work area. The method comprises: determining a starting position of the road work area, receiving actual vehicle status information from each vehicle in a vehicle set, wherein each vehicle in the vehicle set has passed or is determined to pass the starting position of the road work area, the actual vehicle status information being generated by an individual generation component associated with the vehicle, the actual vehicle status information comprising vehicle position data for the vehicle, determining an actual vehicle status information set from the actual vehicle status information of each vehicle in the vehicle set, and determining the road work area characteristic set using the actual vehicle status information set.

20 Claims, 10 Drawing Sheets

(56) References Cited

U.S. PATENT DOCUMENTS

| | | | |
|---|---|---|---|
| 2014/0309833 A1* | 10/2014 | Ferguson | G06K 9/00798 |
| | | | 701/23 |
| 2015/0100224 A1* | 4/2015 | Tsuda | G08G 1/0112 |
| | | | 701/117 |
| 2015/0253141 A1* | 9/2015 | Kesting | G01C 21/32 |
| | | | 701/409 |
| 2016/0379486 A1* | 12/2016 | Taylor | G08G 1/0141 |
| | | | 340/905 |
| 2017/0205242 A1* | 7/2017 | Schmidt | G01C 21/3691 |
| 2017/0242436 A1* | 8/2017 | Creusot | G08G 1/005 |

* cited by examiner

DETERMINATION OF A ROAD WORK AREA CHARACTERISTIC SET

CROSS-REFERENCE TO RELATED APPLICATIONS

This application claims foreign priority benefits under 35 U.S.C. § 119(a)-(d) to European patent application number EP 17168467.3, filed Apr. 27, 2017, which is incorporated by reference in its entirety.

TECHNICAL FIELD

The present disclosure relates to a method for determining a road work characteristic set comprising at least one characteristic associated with a road work area. The present disclosure further relates to a method for informing an information receiver of a road work characteristic set. The present disclosure also relates to a system adapted to determine a road work area characteristic set comprising at least one characteristic associated with a road work area.

BACKGROUND

The presence of road works associated with road segments of a vehicle road system poses many challenges for vehicles travelling within the system. In particular, vehicles travelling along the road segments occupied at least partly by a road work, and which vehicles then have to pass the road work area, are affected. Commonly, due to the decreased accessibility of the road segment to which the road work area is associated, the speed drops for vehicles having to pass the road work area and traffic congestion may start to build up. This congestion may stretch out long before the actual starting point of the road work area.

Generally, the information associated with a road work area is limited to an indication of a starting point for the road work area. For the vehicles travelling along the road segment including the road work area, such an indication can be a road (work) sign or panel located alongside the road informing of upcoming road works, often shortly ahead. The road work sign or panel may even be located almost directly at the starting point of the road works, hence imposing a more or less heads-up warning, or it may be that an indication and/or partial road block appears that closes a portion of the road segment, forcing the driver to change lane for example. Such road work warnings, presented close up to the actual starting point of the road works, often leave little choice to change the travel route to avoid passing the road work area.

The changed driving conditions at a road work area commonly cause an unexpected increase in travel time for the vehicles passing the road work area. Further, when entering into the road work area, it is difficult to foresee how much longer the travel time will be and to what extent passing the road work area will affect the travel. This uncertainty can increase the stress level for a driver of the vehicle and thereby increase the risk of traffic accidents. Noticeably, vehicles passing in the vicinity of a road segment associated with a road work area can also be affected, for example by traffic congestion building up long before the actual starting point of the road work area.

Information indicating upcoming road works may be received by an information system on-board a vehicle, for example via a wireless communication system. In this case, the information associated with the road work area is often collected in a road database. Usually, the road database is updated manually. However, a drawback of manual update and input of data is that it is often not performed frequently enough to provide current relevant information and there is further risk that incorrect data is inserted, due to human error. This can have a further negative effect in that, when the information used, for example by a driver information system onboard the vehicle, is repeatedly incorrect, a driver may tend to start to disregard or neglect the information given, thus rendering the information system useless.

To this end, the development of driver information functions and autonomous driving of vehicles places further demands on improved accuracy, reliability and completeness of data and the characteristics related to road work areas, for their proper function.

Thus, following the above, it is desirable to establish information which comprises actual characteristics associated with a road work area, preferably not only an indication of a starting point, but for example how long the road work stretches from the starting point.

SUMMARY

It is an object of the present disclosure to provide a method that can determine actual characteristics of a road work area.

Thus, a first aspect of the present disclosure relates to a method for determining a road work area characteristic set comprising at least one characteristic associated with a road work area. The method comprises:

determining a starting position of the road work area, receiving actual vehicle status information from each vehicle in a vehicle set, wherein each vehicle in the vehicle set has passed or is determined to pass the starting position of the road work area, the actual vehicle status information being generated by an individual generation component associated with the vehicle, the actual vehicle status information comprising vehicle position data for the vehicle, determining an actual vehicle status information set from the actual vehicle status information of each vehicle in the vehicle set, and determining the road work area characteristic set using the actual vehicle status information set.

A method as recited above implies that upon determining a starting position of a road work area, actual status information for vehicles which have passed or are determined to pass the starting position of the road work area is used to determine characteristics of the road work area. This has the positive effect that the information used reflects actual conditions at the road work area, since it is based on information from vehicles passing the road work area. This implies accurate and reliable information for improving knowledge of e.g., the location of a road work area. A further positive effect is that it implies continuously updated information.

Optionally, the method may comprise comparing the actual vehicle status information set to an expected status for a road segment associated with the starting position of the road work area and wherein the feature of determining the road work area characteristic set comprises comparing the vehicle status information set to the expected status.

The above approach is advantageous since conditions at the road segments under normal driving conditions, i.e., in the absence of any road works, are commonly known and/or can be made readily available, thus making a comparison an effective way of detecting differences in the driving conditions at the road work area. A further positive effect of the determination of actual vehicle status information comprising vehicle position data for each vehicle that has passed or is determined to pass the starting position of the road work area is that it enables the determination of a systematic difference in traffic pattern for the road segment associated with the road work area as compared to the traffic pattern leading up to the road work area.

Optionally, the actual vehicle status information set may further comprise actual vehicle speed data for each vehicle in the vehicle set. In this case, the expected status may comprise a speed limit associated with the road segment. This enables the comparison of the actual vehicle speed at the road work area to the speed limit which under normal driving conditions applies along the road segment associated with the starting point of the road work area. The use of speed data implies an advantageous method since it is generally straightforward to determine vehicle speed as well as speed data, such as speed limits.

Optionally, the actual vehicle status information set may further comprise actual vehicle lane centreline information indicative of at least the number and location of vehicle lane centrelines along which the vehicles in the vehicle set travel. An advantage of this approach is that a change in lane characteristics is often associated with a road work area. Thus, the determination of change in the lane characteristic of a road segment associated with the starting point of the road work area may contribute to determining road work characteristics such as the geographical extension of the road work area, and/or may indicate the starting position of a road work area.

In this case, the method as set out herein may comprise one or more of the following:

comparing an actual distance between two adjacent vehicle lane centrelines in the actual vehicle lane centreline information to an expected distance between two centrelines for the road segment;

comparing an actual distribution among vehicle lane centrelines in the actual vehicle lane centreline information to an expected distribution among the centrelines for the road segment;

comparing a number of separate centrelines to an expected number of separate centrelines for the road segment, and comparing the actual position of an actual vehicle lane centreline in the actual vehicle lane centreline information to an expected position of the centreline for the road segment.

Optionally, the actual vehicle status information set may further comprise information indicative of the presence and/or position of one or more objects indicative of a road work. The detection of objects known to indicate a road work area implies a reliable source of information which is easily available. For instance, the detection of known objects needs not necessarily be combined with a comparison to an expected status.

Optionally, the actual vehicle status information set may further comprise distance to vehicle-in-front for each vehicle in the vehicle set. In this case, the expected status data may comprise a pre-determined distance to vehicle-in-front. A relevant indication of a road work area may be that vehicle queues start to build up due to the restricted accessibility at the road work area, causing the vehicles to stack up closely behind each other. Thus, information of the distance to vehicle-in-front for the vehicles in the vehicle set implies a way of determining if vehicle queues are building up. A further advantage is that this kind of information is readily available or developed from information systems on board the vehicles.

A further advantage of this approach is that an indication to which extent the road work area stretches out and/or affects the traffic situation may be indicated from the extension of the vehicle queue, i.e., how long before the actual starting point of the road work the queue extends.

Optionally, the road work area characteristic set may comprise a geographical extension of the road work area. This information can be advantageous for an appropriate vehicle function, i.e., for example for use in a driver information system or autonomous driving system on-board a vehicle which can carry out an improved planning of the travel and/or keeping the vehicle driver informed of the remaining length of road work area. It provides an advantage over a situation in which only the starting point of a road work area is indicated and known.

Optionally, the road work area characteristic set may comprise an actual driving speed for at least a portion of the road work area. This information is further advantageous, for example for use in a driver information system or autonomous driving system. For example, an actual predicted travel time may be determined with improved accuracy, since the actual driving speed implies an actual measure of the driving conditions at the road work area.

Optionally, the starting position is determined using starting position data received from road work equipment or a road work vehicle. Since road work equipment or road work vehicles are almost always located at the site of a road work area, and in particular at the start of a road work area, it is an advantageous way of receiving information that is reliable and accurate, and easily made available.

Optionally, the starting position of the road work area is determined using starting position data received from an individual generation component associated with a vehicle, preferably a vehicle in the vehicle set. An advantage associated with determining the starting position using one or more vehicles is that in this case starting position data is received directly from the vehicles, thus mitigating the use of other information sources. It enables a simplified direct approach to receiving starting position of the road work area.

Optionally, the starting position data comprises detection of presence and/or position of a road work marker such as a cone, road work sign or a road work panel. It is advantageous to use detection of such objects which are known with a high degree of certainty to be located at a road work area to indicate a starting position of a road work area.

Optionally, each vehicle in the vehicle set may be connected to a cellular network. In this way, information is readily made available and effectively communicated.

A second aspect of the present disclosure relates to a method for informing an information receiver of a road work area characteristic set. The method comprising:

determining the road work area characteristic set as disclosed hereinabove, and issuing a signal indicative of the road work area characteristic set to the information receiver.

By virtue of the second aspect of the present disclosure, information on road work area characteristics may be used by the information receiver, e.g., by an information system.

Optionally, the information receiver may be a vehicle, preferably a car. Thus, the information on road work area characteristics can be received by vehicles, which have not yet passed the starting point of a road work, thus improving planning and prediction of travel route and travel time.

A third aspect of the present disclosure relates to a system for determining a road work area characteristic set comprising at least one characteristic associated with a road work area. The system is adapted to:

receive information indicative of a starting position of the road work area, receive actual vehicle status information from each vehicle in a vehicle set, wherein each vehicle in the vehicle set has passed or is determined to pass the starting position of the road work area, the actual vehicle status information being generated by an individual generation component associated with the vehicle, the actual vehicle status information comprising vehicle position data for the vehicle, determine an actual vehicle status information set from the actual vehicle status information of each vehicle in the vehicle set, and determine the road work area characteristic set using the actual vehicle status information set.

A system as recited above implies that, upon the determination of a starting position of a road work area, actual status information for vehicles which have passed or are determined to pass the starting position of the road work area, is used to determine road work area characteristics. This has the positive effect that the information used reflects actual conditions at the road work area, since it is based on information from vehicles passing the road work area. This implies accurate and reliable information for improving knowledge of the location of a road work area. It also implies continuously updated information.

BRIEF DESCRIPTION OF THE DRAWINGS

The present disclosure will hereinafter be further explained by means of non-limiting examples with reference to the attached drawings.

It should be noted that the attached drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

Figure 1:
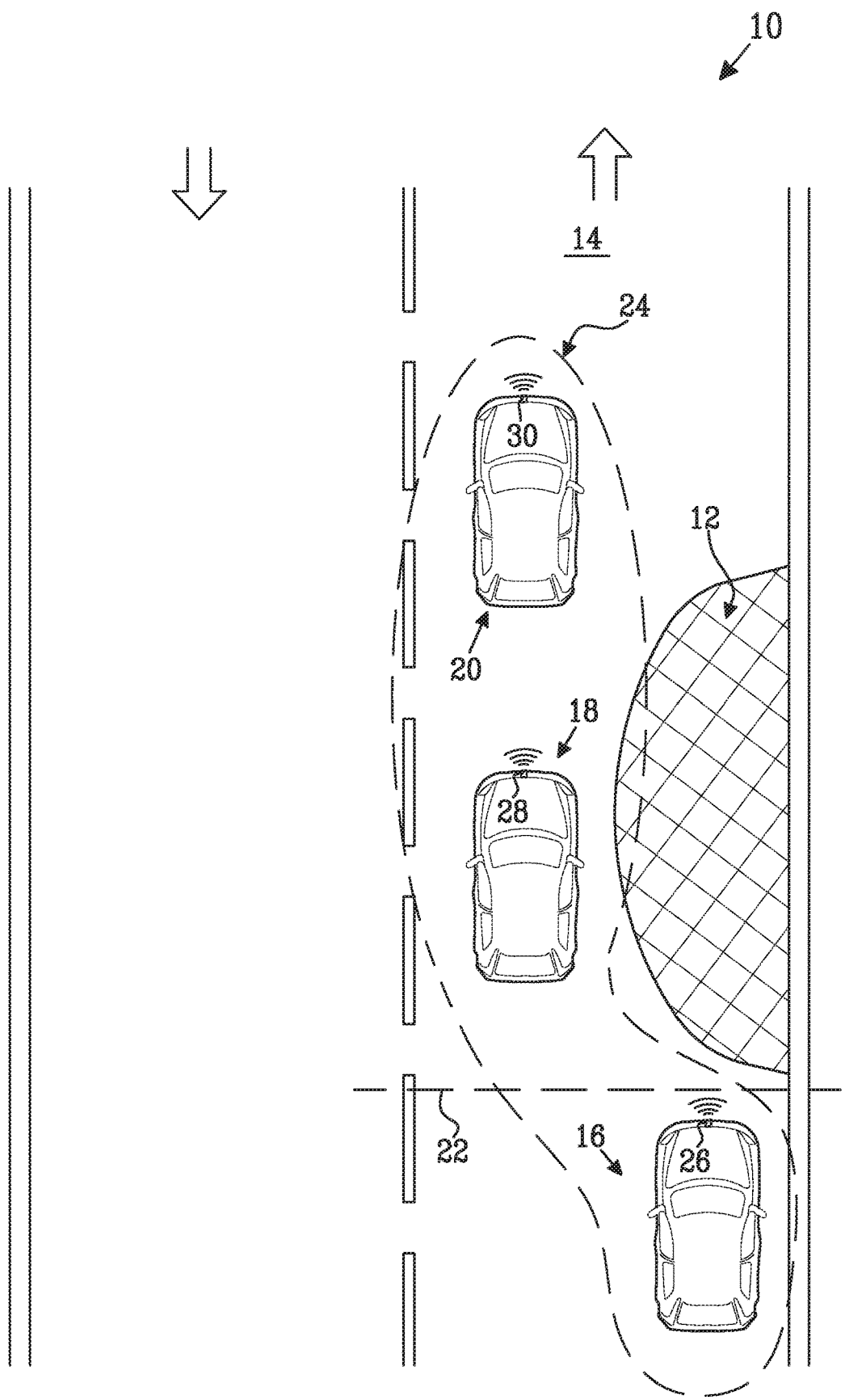
FIG. 1 illustrates a road segment of a vehicle road system, which road segment is associated with a road work area.

FIG. 1 illustrates a road segment 10 of a vehicle road system. The road segment 10 is associated with a starting point 22 of a road work area 12 which is illustrated as partly occupying one lane 14 of the road segment 10 and having a geographical extension along the road segment 10. As easily understood, the extent to which a road work area occupies and thereby limits the accessibility of a road segment, depends on the kind of road work carried out and therefore differs between different road works. In FIG. 1, a single lane in each direction is illustrated, but it is readily understood that a road segment may have any number of lanes in each driving direction. Three vehicles 16, 18, 20 are further depicted illustrating a traffic flow along the road segment 10 and having to pass the road work area 12 along their direction of travel. The starting point 22 of the road work area is indicated by a dashed line in FIG. 1. Two vehicles 18, 20 are depicted as having passed the starting position of the road work, and one vehicle 16 is depicted as determined to pass the starting position of the road work. The three vehicles form a vehicle set 24. Each vehicle 16, 18, 20 is further illustrated as associated with an information generation component 26, 28, 30, which components will be described in more detail in embodiments below. In the FIG. 1 example, all three vehicles 16, 18, 20 are depicted as travelling in the same direction. However, it is also envisaged that the vehicles may travel in different directions. As a non-limiting example, a vehicle (not shown) that is located in the road work area 12 may not yet have passed the starting point 22 but will do so when the vehicle exits the road work area 12.

In order to determine if a vehicle has passed the starting position 22 of the road work area 12, data of the vehicle's position may be used. As a non-limiting example, the historical data of the vehicle's position may be used in order to determine whether the vehicle has travelled past the starting position 22. Purely by way of example, such historical data may be used in conjunction with a road map in order to determine if the vehicle has travelled on a road including the starting position 22. In a similar vein, in order to determine if a vehicle will pass the starting position 22 of the road work area 12, data of the vehicle's position, and possibly also its travel direction, may be used. Again, though purely by way of example, the vehicle's position, and possibly also its travel direction, may be used in conjunction with a road map in order to determine if the vehicle is envisaged to pass the starting position 22.

Figure 2:
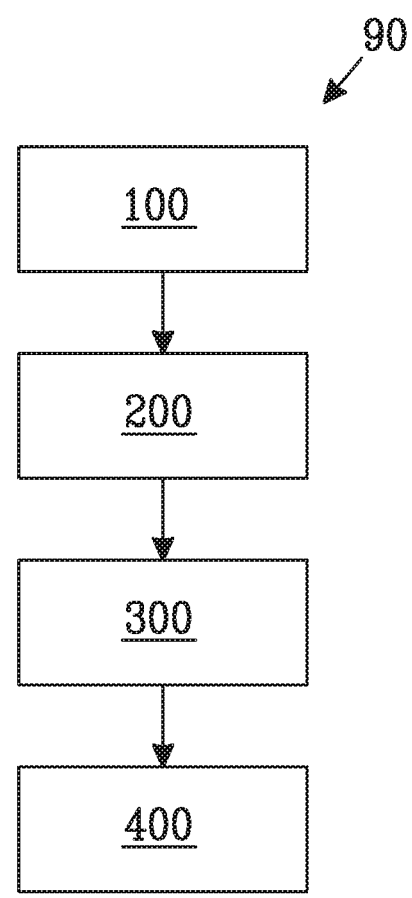
FIG. 2 illustrates an embodiment of a method.

With reference to FIGS. 1 and 2, a method 90 for determining a road work characteristic set comprising at least one characteristic associated with a road work area will hereinafter be described. The method comprises determining 100 a starting position 22 of the road work area 12. The method further comprises receiving 200 actual vehicle status information from each vehicle 16, 18, 20 in a vehicle set 24, wherein each vehicle 16, 18, 20 in the vehicle set 24 has passed or is determined to pass the starting position 22. The actual vehicle status information is generated by an individual generation component 26, 28, 30 associated with the vehicle 16, 18, 20 and comprises vehicle position data for the vehicle. The method further comprises determining 300 an actual vehicle status information set from the actual vehicle status information of each vehicle 16, 18, 20 in the vehicle set 24, and determining 400 the road work area characteristic set using the actual vehicle status information set.

Figure 3:
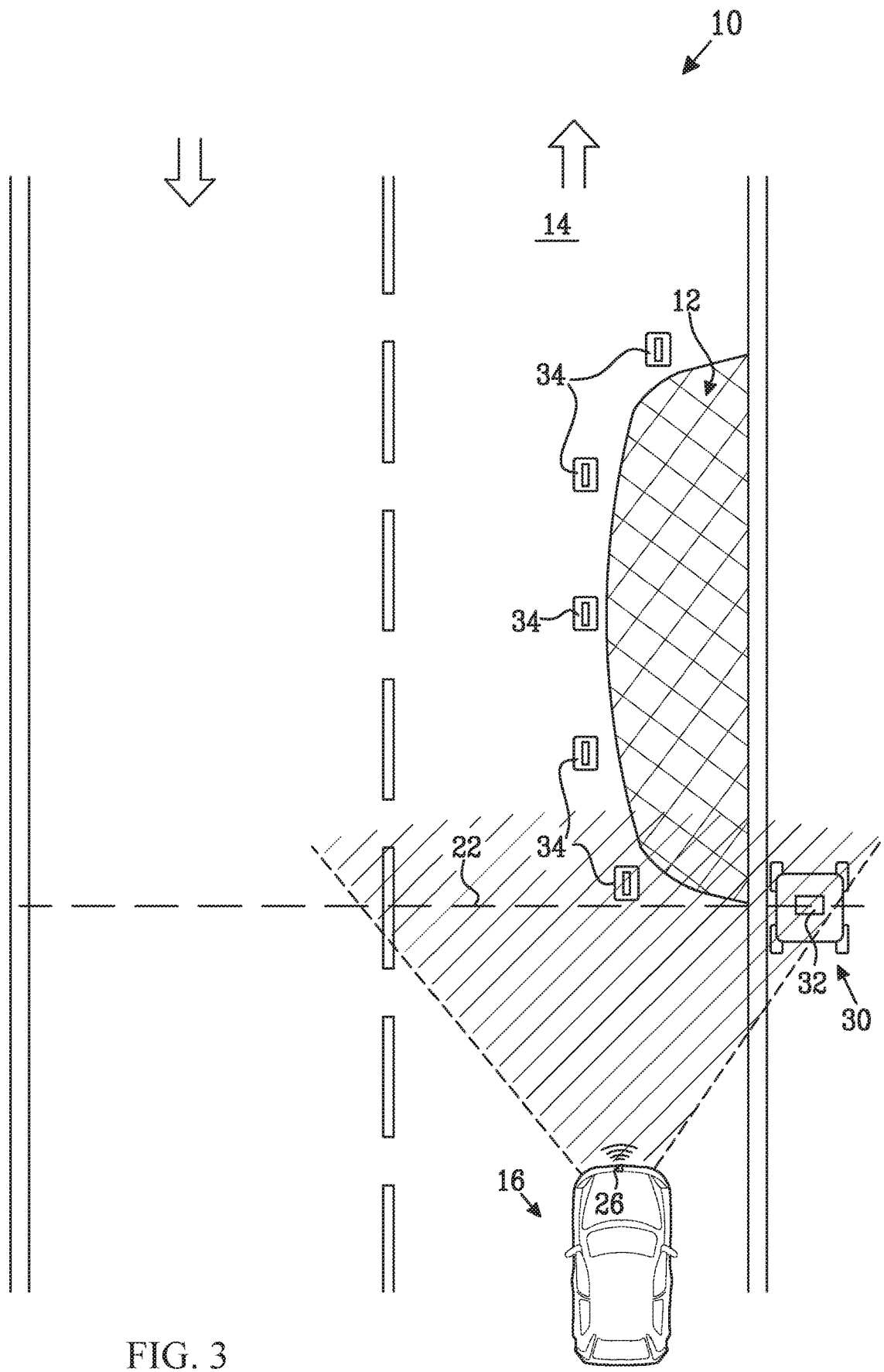
FIG. 3 illustrates an embodiment of the present disclosure.
Figure 4:
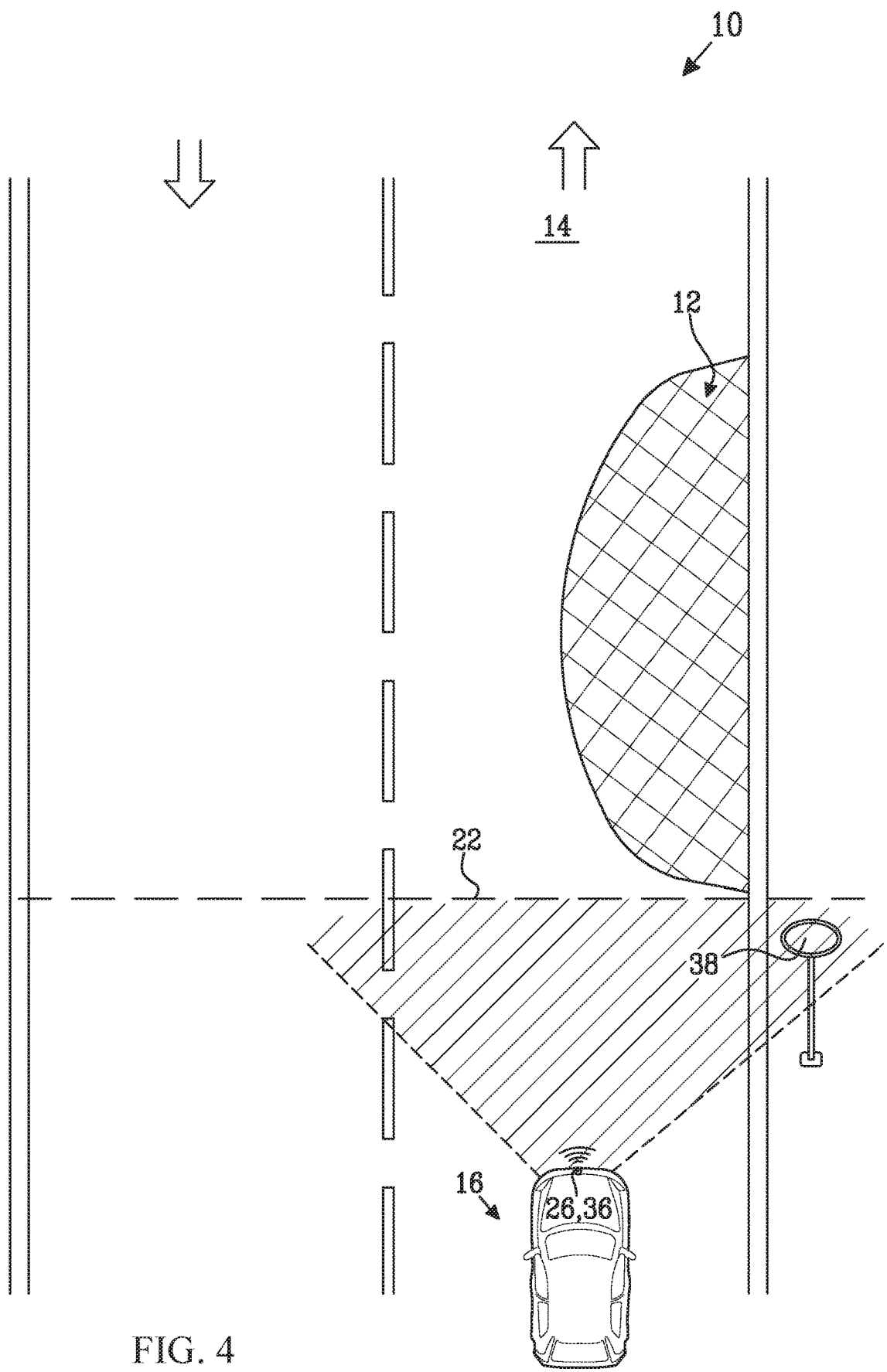
FIG. 4 illustrates an embodiment of the present disclosure.

As exemplified in FIG. 3, in embodiments herein, the starting position may be determined using starting position data received from road work equipment, for example a road work vehicle 30. As illustrated in FIG. 3, the start of a road work is most often marked by road work equipment or a road work vehicle 30. Thus, by associating the equipment or vehicle 30 with means 32 to detect its position, e.g., by GPS, and communicating the position data, the starting position of the road work is easily available.

Optionally, the starting position 22 of the road work area 12 may be determined using starting position data received from a vehicle, preferably a vehicle 16 in the vehicle set 24, see FIG. 3. In this case, the starting position data may comprise detection of presence and/or position of one or more road work markers 34 such as cones, temporary lane separator objects, road work signs, road work panels or barriers. The vehicles 16, 18, 20 may be equipped with detection means 26, 28, 30 such as camera and/or radar and/or lidar sensors, possibly primarily intended for other purposes, but which may also be used for detection of road work markers 34. In this way, starting position data is easily available.

Thus, the determination of the starting position 22 of the road work may comprise the detection, e.g., by camera, of single cones or single temporary lane separator objects, or a road work sign or panel.

The actual vehicle status data for each vehicle 16, 18, 20 in the vehicle set 24 comprises vehicle position data. The vehicles may be equipped with a GNSS receiver such as a GPS receiver, hence vehicle position data may be generated by measuring of some GNSS-system and the individual generation component 26, 28, 30 of each vehicle 16, 18, 20 may comprise a GNSS receiver for this purpose.

In embodiments herein, the method 90 may further comprise comparing the actual vehicle status information set to an expected status for a road segment 10 associated with the starting position 22 of the road work area 12, and wherein the feature of determining 400 the road work area characteristic set comprises comparing the actual vehicle status information set to the expected status.

In the following, embodiments using different kinds of actual vehicle status information sets for comparison to an expected status are described, with reference to FIGS. 3 to 6.

As set out herein, an expected status for the road segment 10 associated with the starting position 22 of the road work area 12 may comprise information indicative of normal driving conditions and/or characteristics along the road segment 10, i.e., in the absence of any road works. As non-limiting examples, an expected status for the road segment 10 associated with the starting position 22 of the road work area 12 may comprise a speed limit for the road segment and/or information indicative of an expected number of and position of lane centrelines for the road segment 10. This kind of information can be readably accessible from a road database. Optionally and/or additionally, expected status data for the road segment 10 associated with the starting point 22 of the road work area 12 may be received from vehicles travelling along the road segment 10. The vehicles may thus be equipped with detection means, such as camera and/or radar and/or lidar sensors. The expected status data which may be received in this way will be described in further detail in embodiments below.

In embodiments herein, the actual vehicle status information set may further comprise actual vehicle speed data for each vehicle 16, 18, 20 in the vehicle set 24. Actual vehicle speed data may easily be received from a vehicle comprising e.g., a vehicle speed sensor 26, 36, see FIG. 4. The vehicle speed may also be derived from the vehicle position data for the vehicle.

In this case, the expected status may comprise a speed limit 38 associated with the road segment 10. This information may be easily available from a road database. Optionally, the speed limit could also be detected through vehicle camera-detection, e.g., by detecting the speed limit signs and their associated speed limit.

Figure 5A:
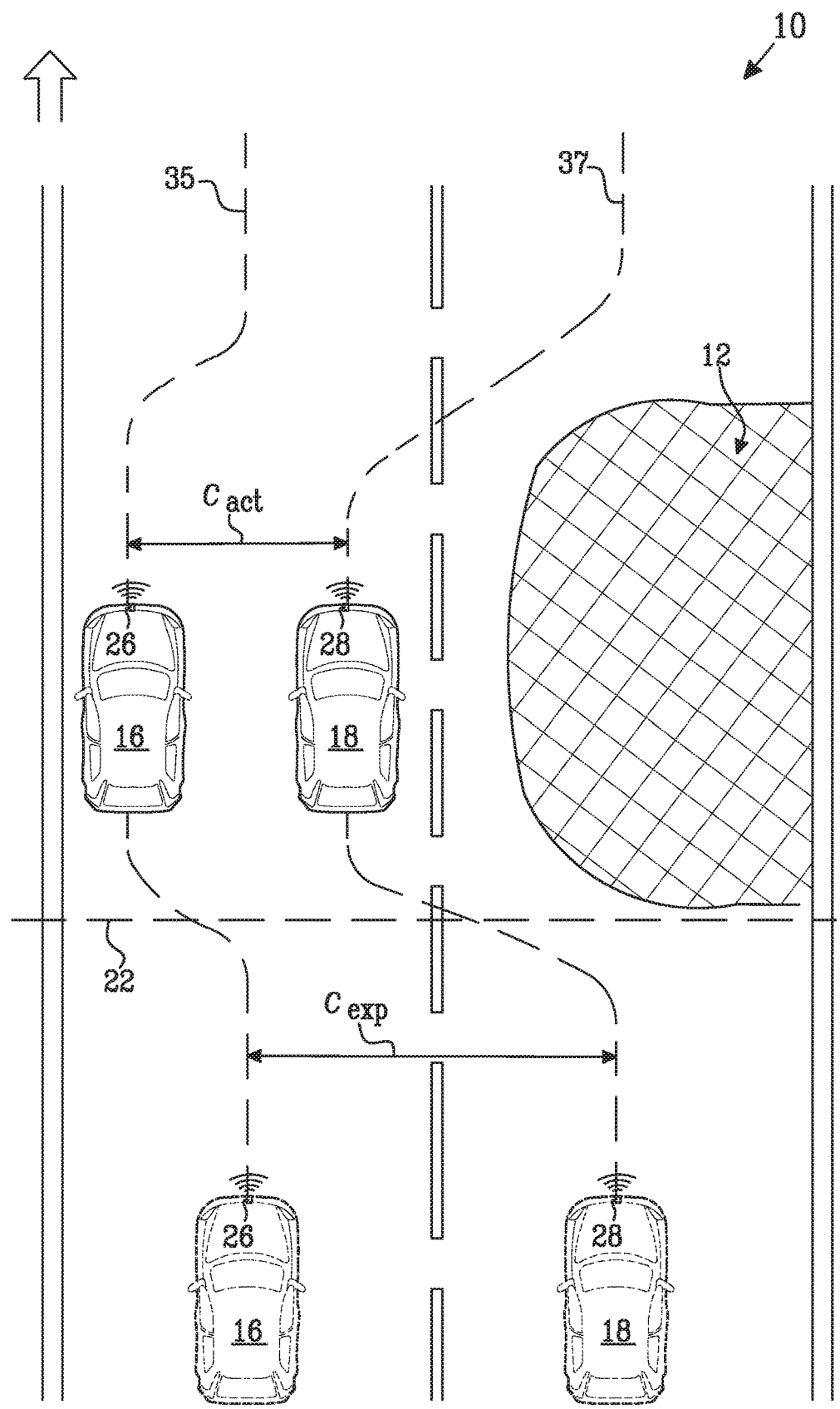
FIGS. 5A, 5B and 5C illustrate embodiments of the present disclosure.
Figure 5B:
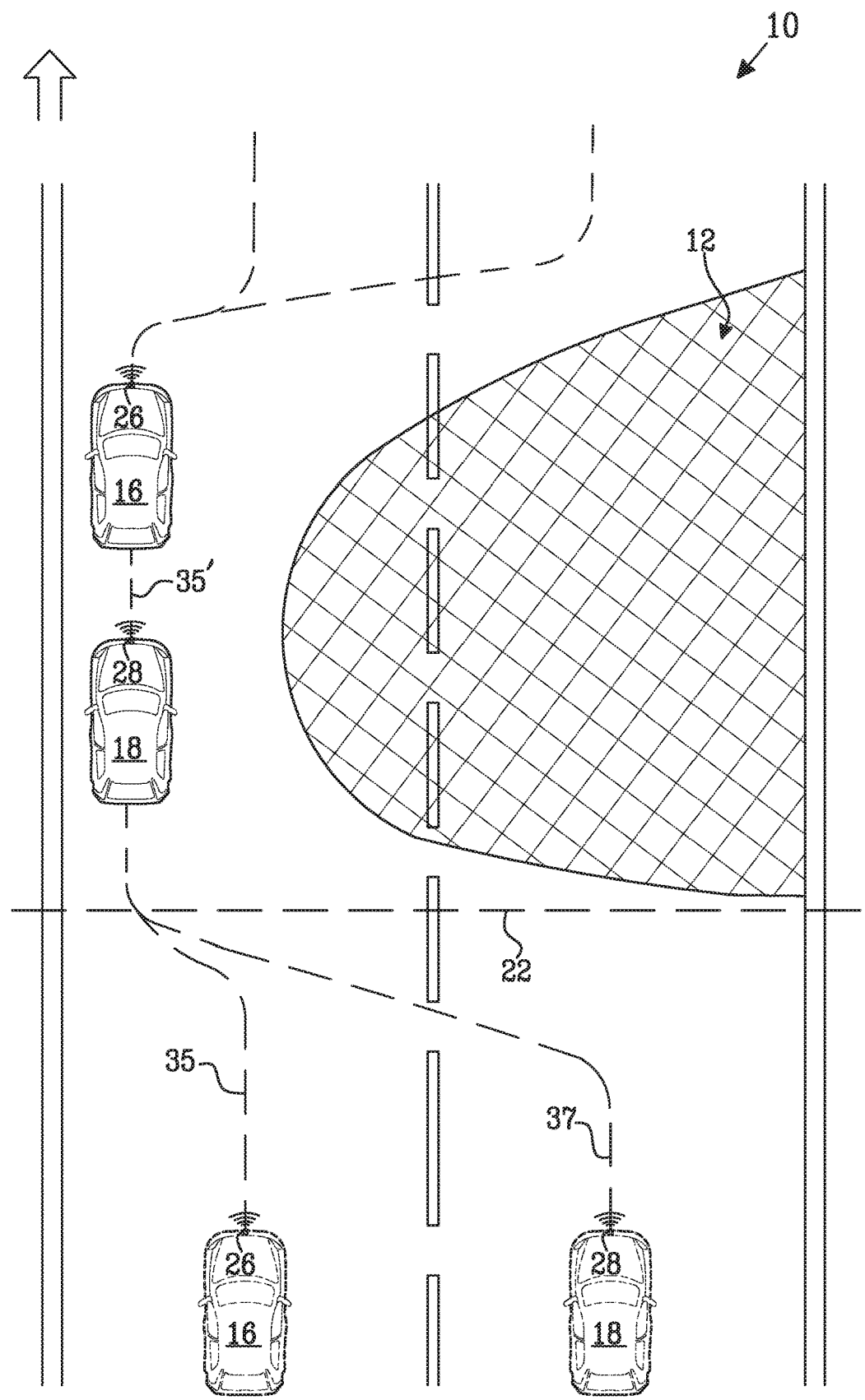
Figure 5C:
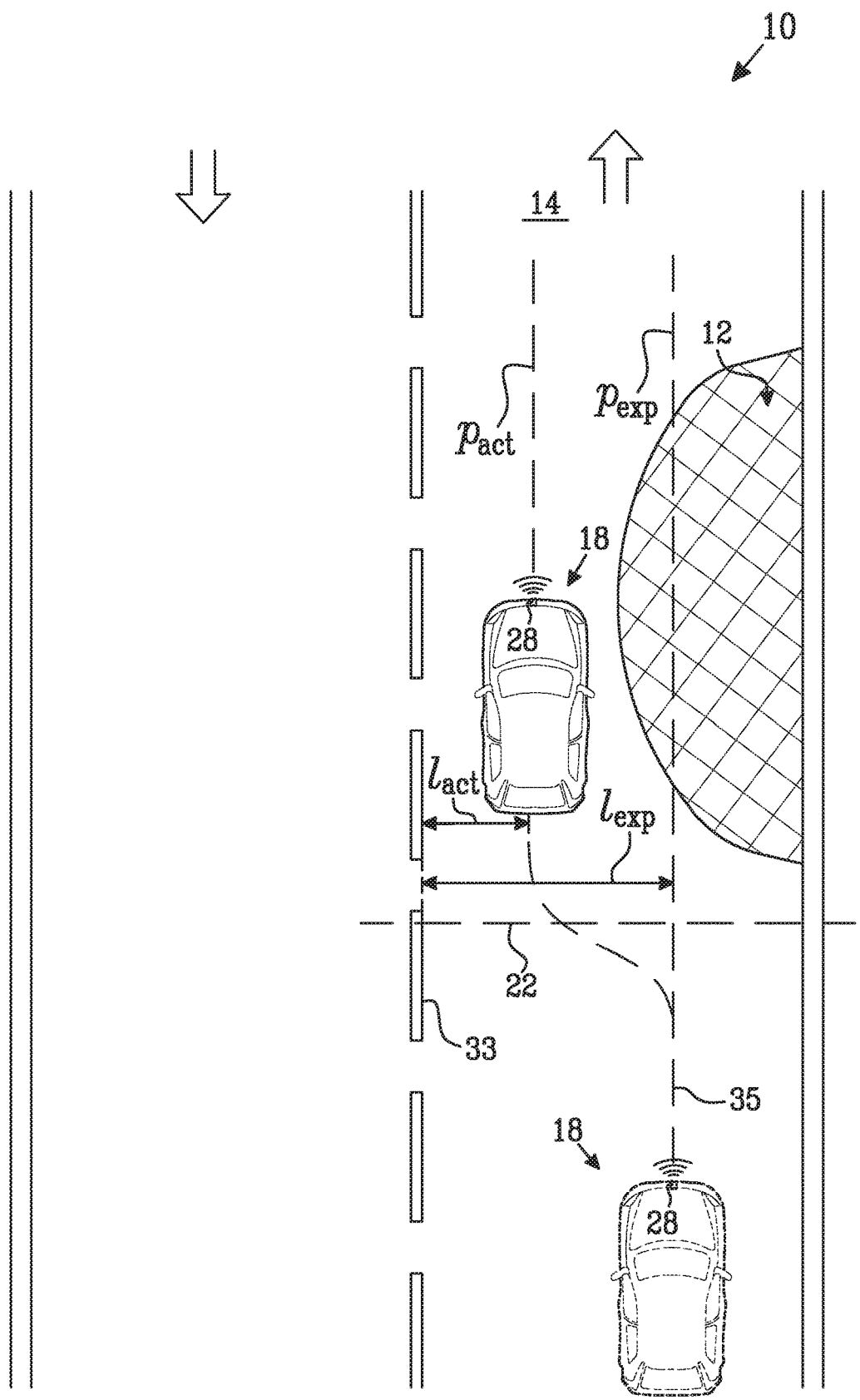
Figure 6:
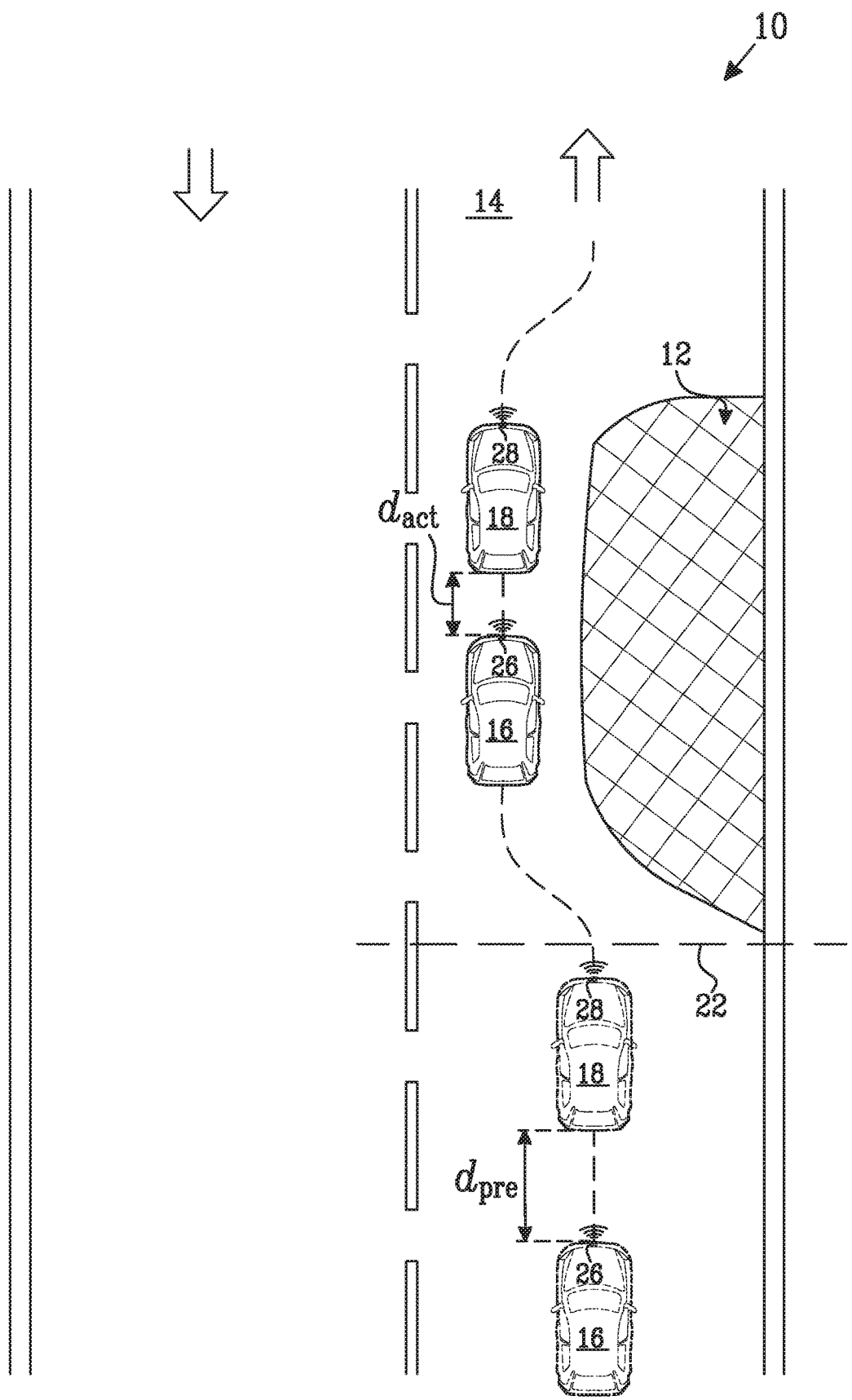
FIG. 6 illustrates an embodiment of the present disclosure.

With reference to FIGS. 5A, 5B and 5C, embodiments herein will be described, in which the actual vehicle status information set further comprises actual vehicle lane centreline information indicative of at least the number and location of vehicle lane centrelines along which the vehicles in the vehicle set travel.

As a non-limiting example, for a vehicle 16, 18, 20 travelling along a portion of the road segment 10 and for which vehicle position data is received, for instance wherein the position as taken from a GNSS positioning system, multiple such successive positions together with their order in time may create a so-called position trace of the vehicle. Similar position traces for a plurality of vehicles 16, 18, 20, i.e., position traces taken from the same portion of road segment 10, may be identified and aggregated. Using for instance the information from GNSS positioning, traces may be aggregated to a centreline for the stretch of road. Such traces may form actual vehicle lane centreline information, i.e., information indicative of at least the number and location of vehicle lane centrelines along which the vehicles in the vehicle set travel.

However, it is also envisaged that actual vehicle lane centreline information may be determined using other procedures. For instance, it is envisaged that actual vehicle lane centreline information may be determined using data from only one vehicle, or individual data from a plurality of vehicles, which individual data need not necessarily be aggregated in the manner described hereinabove.

Irrespective of how the actual vehicle lane centreline information is determined, it may be indicative of the location and/or other characteristics of a road work area. Examples of how this may be achieved are presented hereinbelow. The below examples can be used separately or in any combination.

As a first non-limiting example, with reference to FIG. 5A, an actual distance $c_{act}$ between two adjacent vehicle lane centrelines 35, 37 in the actual vehicle lane centreline information may be compared to an expected distance $c_{exp}$ between two centrelines 35, 37 for the road segment 12. In FIG. 5A, a common situation at a road work area is illustrated in which the position of two lane centrelines 35, 37 have been established. In the FIG. 5A example, both the centrelines 35, 37 temporarily change course, whilst passing the road work area. Due to the limited space for travelling along the road work area, the lane centrelines 35, 37 move closer to each other—as indicated by the actual distance $c_{act}$ between two adjacent vehicle lane centrelines 35, 37—thus a reduced distance between the two centrelines may be detected, which in this case may be indicative of the road work area.

As a second non-limiting example, an actual distribution among vehicle lane centrelines in the actual vehicle lane centreline information may be compared to an expected distribution among the centrelines for the road segment 10. The relevance thereof may be attributed to the limited accessibility, and limited driving space, at a road work area. As a result, vehicles passing along the road work area tend to line up in a more precise way, i.e., with reduced deviations from the actual vehicle lane centrelines. The limited space requires more careful driving; so as not to accidently collide with other vehicles or road work markers or equipment for example. This may be detected as a reduced distribution among vehicle lane centrelines, which may be indicative of a road work area. Purely by way of example, the actual distribution among vehicle lane centrelines may be determined by determining a statistical deviation, such as a standard deviation, from each average vehicle lane centreline.

As a third non-limiting example, with reference to FIG. 5B, a number of separate centrelines 35' may be compared to an expected number of separate centrelines 35, 37 for the road segment 10. FIG. 5B depicts two expected lane centrelines 35, 37 joining into a single lane centreline 35' along a road work area, thus illustrating a common situation at a road work area. Hence, a reduction of the number of lanes may be indicative of a road work area.

As a fourth non-limiting example, with reference to FIG. 5C, the actual position $p_{act}$ of an actual vehicle lane centreline in the actual vehicle lane centreline information may be compared to an expected position $p_{exp}$ of the centreline for the road segment. In FIG. 5C, a single centreline 35 is illustrated, which temporarily changes its course along the road work area. Thus, a changed position of a centreline 35 may be indicative of a road work area.

Additionally, for a vehicle equipped with means to detect the lane in which it is currently located, for example by using a camera and/or radar and/or lidar sensor, in addition to its positioning data, the traces may be aggregated per lane to form lane centrelines. Thus, the actual position $p_{act}$ of an actual vehicle lane centreline 35 in the actual vehicle lane centreline information may be compared to the position of a lane delimiting marker 33, such as road marking, in order to determine an actual horizontal distance $l_{act}$ between the actual position $p_{act}$ and the lane delimiting marker 33. Such an actual horizontal distance $l_{act}$ may be compared to an expected horizontal distance $l_{exp}$ between an expected position of the centreline and lane delimiting marker 33. A difference between the actual horizontal distance $l_{act}$ and the expected horizontal distance $l_{exp}$ may be an indication of a road work area.

In embodiments herein, the actual vehicle status information set may further comprise distance to vehicle-in-front for each vehicle in the vehicle set. A vehicle equipped with camera and/or radar and/or lidar sensors may easily be set to establish a distance to vehicle-in-front $d_{act}$. To this end, the expected status data may comprise a pre-determined distance to vehicle-in-front $d_{pre}$, see FIG. 6. As a non-limiting example, the pre-determined distance to vehicle-in-front $d_{pre}$ may be established using a speed limit associated with the road segment, for instance by combining the speed limit and an expected time gap between adjacent vehicles. Thus, a reduced distance to vehicle-in-front may be established by comparison of actual data to expected data, and being indicative of a vehicle queue starting to build up, which is a most common characteristic feature of a road work area.

Optionally and/or additionally, the actual vehicle status information set may further comprise information indicative of the presence and/or position of one or more objects indicative of a road work. Objects indicative of a road work may be road work markers 34 such as cones, temporary lane separator objects, road work signs, road work panels or barriers. With reference to FIG. 3, a vehicle can detect positions of such road work markers, e.g., the position of a single road work marker, or the start and end position of successive road work markers along an extension of the road segment 10. In this case, detection is based on camera and/or lidar and/or radar sensors associated with the vehicle.

Moreover, again with reference to FIG. 3, the actual vehicle status information set may further comprise information indicative of the presence and/or position of one or more objects indicative of a road work. As such, though purely be way of example, the actual vehicle status information set may comprise the presence and position of a plurality of road work markers 34. The position of each one of the road work markers 34 may then be assembled to a line indicating the extension of the road work area.

In embodiments herein, the road work area characteristic set may comprise the geographical extension of the road work area and/or an actual driving speed for at least a portion of the road work area. This follows from the determination of actual vehicle status data and the derivation of systematic differences along a portion of the road segment, which differences may be indicative of a road work area and characteristics thereof. For example, from the determination of a systematic difference indicative of a road work, along an extension of a road segment and which extension of the systematic difference coincides with a known starting position of a road work area, the geographical extension of the road work area may be derived.

In embodiments herein, each vehicle in the vehicle set may be connected to a cellular network. This enables information to be collected and shared by the connected vehicles.

Figure 7:
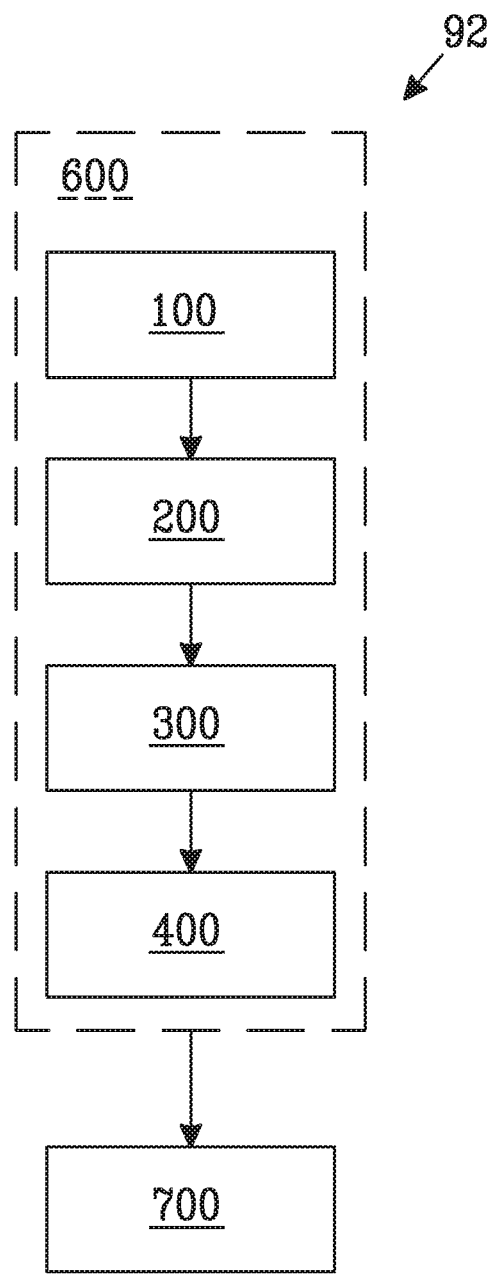
FIG. 7 illustrates an embodiment of a method.

With reference to FIG. 7, a method 92 for informing an information receiver of a road work area characteristic set is described. The method comprises:

determining 600 the road work area characteristic set as disclosed herein, and issuing 700 a signal indicative of the road work area characteristic set to the information receiver.

By virtue of this method, the determined road work area characteristics may be used by the information receiver, e.g., by an information system. In a preferred embodiment, the information receiver may be a vehicle, preferably a car or a receiver device associated with the car, such as a smart phone. Thus, the information on road work area characteristics may be received by connected vehicles. As a non-limiting example, vehicles which have not yet passed the starting point 22 of a road work area 12 may receive information on the characteristics of upcoming road works, thus improving planning and prediction of travel route and travel time.

Figure 8:
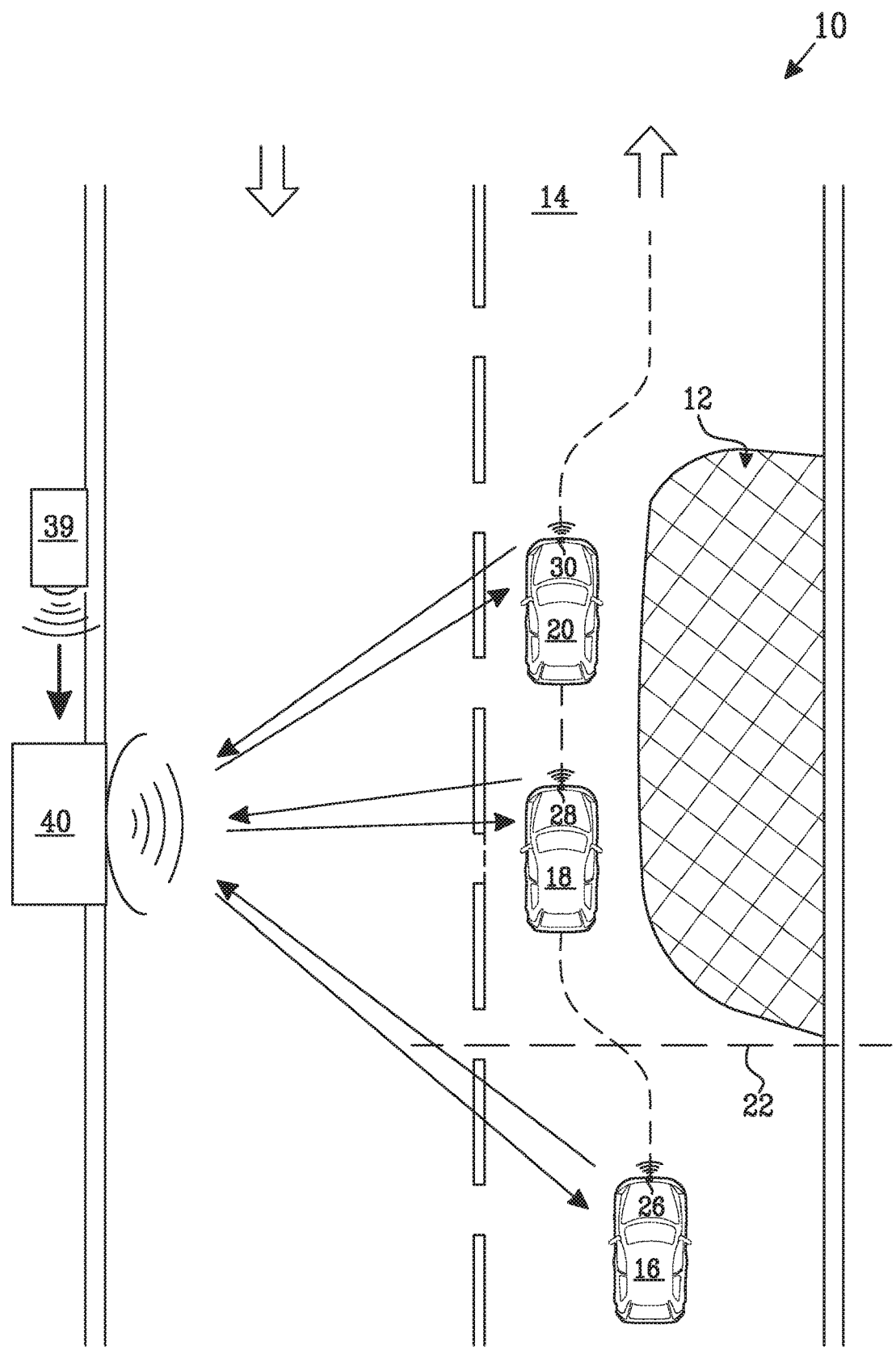
FIG. 8 illustrates a system according to the present disclosure.

With reference to FIG. 8, a system 40 for determining a road work area characteristic set comprising at least one characteristic associated with a road work area will be described.

The System 40 is Adapted to:

receive information indicative of a starting position 22 of the road work area 12, receive actual vehicle status information from each vehicle 16, 18, 20 in a vehicle set 24, wherein each vehicle 16, 18, 20 in the vehicle set 24 has passed or is determined to pass the starting position 22 of the road work area 12, the actual vehicle status information being generated by an individual generation component 26, 28, 30 associated with the vehicle 16, 18, 20, the actual vehicle status information comprising vehicle position data for the vehicle, determine an actual vehicle status information set from the actual vehicle status information of each vehicle 16, 18, 20 in the vehicle set 24, and determine the road work area characteristic set using the actual vehicle status information set.

The system 40 may, as a non-limiting example, form part of a cloud-based solution, see FIG. 8, such that a plurality of connected vehicles 16, 18, 20 can send actual vehicle status information to the system 40, e.g., via the cloud, indicative of at least their position, i.e., as measured by some GNSS-system. To this end, it should be noted that each vehicle comprises vehicle status data information generation component(s) 26, 28, 30, as described previously. Further, the system 40 may receive expected status data for road segments along which the connected vehicles travel from an information source 39, e.g., a road database, connected to the system 40.

In such a solution, the system 40, e.g., a server, will operate to derive and infer the determined road work area characteristic set in the system 40 for subsequent use by the connected vehicles 26, 28, 30. For example, the location of the road work, its geographical extension and the actual driving speed at the road work area may be received by on-board vehicle logic in an information system. In this way, the connected vehicles 26, 28, 30 may inform the drivers of road works further ahead. The in-vehicle logic may also for example be adapted to inform the driver of the remaining length of a road work which may reduce stress, especially for longer road works.

As one skilled in the art would understand, the system 40, the information generation components 26, 28, 30, and any other system, subsystem, device, logic, or module described herein may individually, collectively, or in any combination comprise appropriate circuitry, such as one or more appropriately programmed processors (e.g., one or more microprocessors including central processing units (CPU)) and associated memory, which may include stored operating system software and/or application software (e.g., instructions) executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

What is claimed is:

1. A method for determining a road work area characteristic set comprising at least one characteristic associated with a road work area, wherein the road work area characteristic set comprises a geographical extension of the road work area and/or an actual driving speed for at least a portion of the road work area, the method comprising:
    determining a starting position of the road work area, wherein the starting position is determined using starting position data received from road work equipment or a road work vehicle or wherein the starting position of the road work area is determined using starting position data received from an individual generation component associated with a vehicle;
    receiving actual vehicle status information from each vehicle in a vehicle set, wherein each vehicle in the vehicle set has passed or is determined to pass the starting position of the road work area, the actual vehicle status information being generated by an individual generation component associated with the vehicle, the actual vehicle status information comprising vehicle position data for the vehicle;
    determining an actual vehicle status information set from the actual vehicle status information of each vehicle in the vehicle set, wherein the actual vehicle status information set comprises at least one of:
        actual vehicle speed data for each vehicle in the vehicle set,
        information indicative of presence and/or position of one or more objects indicative of a road work, or distance to vehicle-in-front for each vehicle in the vehicle set; and
    determining the road work area characteristic set using the actual vehicle status information set.

2. The method according to claim 1, wherein the method comprises comparing the actual vehicle status information set to an expected status for a road segment associated with the starting position of the road work area and wherein the feature of determining the road work area characteristic set comprises comparing the vehicle status information set to the expected status.

3. The method according to claim 1, wherein the expected status comprises a speed limit associated with the road segment.

4. The method according to claim 1, wherein the actual vehicle status information set further comprises actual vehicle lane centreline information indicative of at least the number and location of vehicle lane centrelines along which the vehicles in the vehicle set travel.

5. The method according to claim 4, further comprising comparing the actual vehicle status information set to an expected status for a road segment associated with the starting position of the road work area, wherein determining the road work area characteristic set comprises comparing the vehicle status information set to the expected status, and wherein the method comprises one or more of the following:
    comparing an actual distance between two adjacent vehicle lane centrelines in the actual vehicle lane centreline information to an expected distance between two centrelines for the road segment;
    comparing an actual distribution among vehicle lane centrelines in the actual vehicle lane centreline information to an expected distribution among the centrelines for the road segment;
    comparing a number of separate centrelines to an expected number of separate centrelines for the road segment, and
    comparing the actual position of an actual vehicle lane centreline in the actual vehicle lane centreline information to an expected position of the centreline for the road segment.

6. The method according to claim 1, further comprising comparing the actual vehicle status information set to an expected status for a road segment associated with the starting position of the road work area, wherein determining the road work area characteristic set comprises comparing the vehicle status information set to the expected status, and wherein the expected status comprises a pre-determined distance to vehicle-in-front.

7. The method according to claim 1, wherein the starting position data comprises detection of presence and/or position of a road work marker.

8. The method according to claim 7, wherein the road work marker comprises a cone, a road work sign or a road work panel.

9. The method according to claim 1, wherein each vehicle in the vehicle set is connected to a cellular network.

10. A method for informing an information receiver of a road work area characteristic set, the method comprising:
    determining the road work area characteristic set according to claim 1; and
    issuing a signal indicative of the road work area characteristic set to the information receiver.

11. The method according to claim 10, wherein the information receiver is a vehicle.

12. A system for determining a road work area characteristic set comprising at least one characteristic associated with a road work area, wherein the road work area characteristic set comprises a geographical extension of the road work area and/or an actual driving speed for at least a portion of the road work area, the system comprising:

circuitry configured so that the system is operable to:

receive information indicative of a starting position of the road work area, wherein the starting position is determined using staring position data received from road work equipment or a road work vehicle or wherein the starting position of the road work area is determined using starting position data received from an individual generation component associated with a vehicle;

receive actual vehicle status information from each vehicle in a vehicle set when each vehicle in the vehicle set has passed or is determined to pass the starting position of the road work area, the actual vehicle status information being generated by an individual generation component associated with the vehicle, the actual vehicle status information comprising vehicle position data for the vehicle;

determine an actual vehicle status information set from the actual vehicle status information of each vehicle in the vehicle set, wherein the actual vehicle status information set comprises at least one of:

actual vehicle speed data for each vehicle in the vehicle set, information indicative of the presence and/or position of one or more objects indicative of a road work, or distance to vehicle-in-front for each vehicle in the vehicle set; and determine the road work area characteristic set using the actual vehicle status information set.

13. The method according to claim 1, wherein the starting position of the road work area is determined using starting position data received from the individual generation component associated with the vehicle, and wherein the vehicle is a vehicle in the vehicle set.

14. The method according to claim 1, wherein the method is performed using a system comprising a server.

15. The method according to claim 1, wherein the method is performed using a system comprising circuitry and memory, which includes operating instructions executable by the circuitry.

16. The system according to claim 12, wherein the starting position of the road work area is determined using starting position data received from the individual generation component associated with the vehicle, and wherein the vehicle is a vehicle in the vehicle set.

17. The system according to claim 12, wherein the circuitry comprises one or more processors and associated memory.

18. A method for determining a road work area characteristic set comprising at least one characteristic associated with a road work area, the method comprising:

determining a starting position of the road work area;

receiving actual vehicle status information from each vehicle in a vehicle set, wherein each vehicle in the vehicle set has passed or is determined to pass the starting position of the road work area, the actual vehicle status information being generated by an individual generation component associated with the vehicle, the actual vehicle status information comprising vehicle position data for the vehicle;

determining an actual vehicle status information set from the actual vehicle status information of each vehicle in the vehicle set, wherein the actual vehicle status information set comprises actual vehicle lane centreline information indicative of at least number and location of vehicle lane centrelines along which the vehicles in the vehicle set travel; and determining the road work area characteristic set using the actual vehicle status information set;

wherein the method further comprises comparing the actual vehicle status information set to an expected status for a road segment associated with the starting position of the road work area, wherein determining the road work area characteristic set comprises comparing the vehicle status information set to the expected status, and wherein the method further comprises one or more of the following:

comparing an actual distance between two adjacent vehicle lane centrelines in the actual vehicle lane centreline information to an expected distance between two centrelines for the road segment;

comparing an actual distribution among vehicle lane centrelines in the actual vehicle lane centreline information to an expected distribution among the centrelines for the road segment;

comparing a number of separate centrelines to an expected number of separate centrelines for the road segment;

comparing the actual position of an actual vehicle lane centreline in the actual vehicle lane centreline information to an expected position of the centreline for the road segment.

19. The method according to claim 18, wherein the method is performed using a system comprising a server.

20. The method according to claim 19 further comprising issuing a wireless signal indicative of the road work area characteristic set to an information receiver.

* * * * *